United States Patent [19]

Ota et al.

[11] Patent Number: 4,767,193
[45] Date of Patent: Aug. 30, 1988

[54] DISPLAY UNIT WITH BENT FLUORESCENT LAMP

[75] Inventors: Makoto Ota, Yokohama; Hiroshi Sawamura, Sagamihara; Masao Karino, Kamakura; Osamu Myodo, Kamakura; Makoto Yamanoshita, Kamakura; Toyohiro Fujiwara, Sagamihara, all of Japan

[73] Assignee: Mitsubishi Denki Kabushiki Kaisha, Tokyo, Japan

[21] Appl. No.: 813,287

[22] Filed: Dec. 24, 1985

[30] Foreign Application Priority Data

Dec. 25, 1984 [JP] Japan .............................. 59-200302[U]
Jul. 10, 1985 [JP] Japan .............................. 60-105002[U]

[51] Int. Cl.$^4$ ........................... G02F 1/13; H02H 7/19; H01J 1/62
[52] U.S. Cl. ..................................... 350/345; 313/493; 362/217
[58] Field of Search ................. 40/441, 448, 451, 452, 40/541, 542, 548, 152.2; 362/19, 23, 29, 28, 217; 350/345; 313/493; 340/784

[56] References Cited

U.S. PATENT DOCUMENTS

| 3,868,182 | 2/1975 | Kidd | 362/217 X |
| 4,334,734 | 6/1982 | Hareng et al. | 350/345 X |
| 4,578,672 | 3/1986 | Oota | 340/784 X |

FOREIGN PATENT DOCUMENTS

| 0155829 | 9/1984 | Japan | 350/345 |
| 0165035 | 8/1985 | Japan | 313/493 |
| 0187995 | 3/1962 | Sweden | 362/217 |
| 0285962 | 9/1950 | Switzerland | 40/152.2 |

Primary Examiner—Stanley D. Miller
Assistant Examiner—David Lewis
Attorney, Agent, or Firm—Armstrong, Nikaido, Marmelstein & Kubovcik

[57] ABSTRACT

A new type of display unit is provided. A light emitting body such as a fluorescent lamp is disposed behind an elongated display panel. The middle section of the fluorescent lamp extends parallel to the elongated display panel to face it from end to end. The opposite ends of the lamp are bent if necessary.

5 Claims, 2 Drawing Sheets

DISPLAY UNIT WITH BENT FLUORESCENT LAMP

BACKGROUND OF THE INVENTION

The present invention relates to a display unit for constituting a large display screen of a display apparatus and, more particularly, to an improved display unit in which the distribution of luminance over the entire area of the display panel is uniform.

A conventional liquid crystal display unit, namely, a typical display unit for constituting a large display screen of a display apparatus, is illustrated in FIG. 10. In FIG. 10, there are shown a case 1, a guide groove 1a formed in the case 1, a liquid crystal panel 2, namely, a display panel, a straight fluorescent lamp 3 disposed within and held on the case 1 and provide at the opposite ends 3a thereof with bases 3b, a reflecting plate 4 holding the liquid crystal panel 2 and disposed within and held on the case 1 so as to reflect the light emitted by the fluorescent lamp 3 toward the backside of the liquid crystal panel 2, a diffusion film 5 held on the reflecting plate 4 to diffuse the light emitted by the fluorescent lamp 3 so that the backside of the liquid crystal panel 2 is irradiated, a D/A conversion circuit board 6 having a circuit capable of D/A conversion, a liquid crystal driving circuit board 7 mounted with a LSI for driving the liquid crystal panel 2 on the basis of analog signals provided by the D/A conversion circuit board 6, and a connector 8 for connecting the fluorecent lamp 3 to a power source, not shown.

A plurality of the liquid crystal display units thus consituted are mounted on a supporting frame by receiving the guide rails of the supporting frame in the guide grooves 1a of the liquid crystal display units, respectively, so as to form a display screen of a predetermined size and shape.

In operation, digital signals corresponding to a still picture or an animated picture, produced by an external controller, not shown, are converted into corresponding analog signals meeting the characteristics of the liquid crystal by the circuit of the D/A conversion circuit board 6. The analog signals thus produced are transmitted through the liquid crystal driving circuit board 7 to the liquid crystal panel 2. Since the liquid crystal panel 2 itself is a nonluminous element, a light source is necessary for illuminating the liquid crystal panel 2. The fluorescent lamp 3 is lighted by a fluorescent lamp starting device, not shown to illuminate the liquid crystal panel 2. The light transmissivity of the liquid crystal panel 2 is controlled according to the analog signals given thereto so that an image corresponding to the still picture or the animated picture is displayed on the liquid crystal panel 2.

In such a conventional display unit, since the fluorescent lamp 3 is provided, at the opposite ends thereof with bases and filaments, respectively, the luminance of the end section is lower than that of the middle section of the fluorescent lamp. Furthermore, the luminance of the end section of the fluorescent lamp decreases with the passage of time more remarkably than the luminance of the middle section of the same and the black stain of the end section increases with time, which is a specific phenomenon to the fluorescent lamp. When a large display screen is formed by arranging a plurality of the liquid crystal display units having such characteristics on a supporting frame, not shown, the irregularity of the luminance of the liquid crystal display panels forming the display screen becomes conspicuous, thus reducing the quality of the displayed image.

SUMMARY OF THE INVENTION

The present invention has been made to solve those problems of the conventional display unit.

Accordingly, it is an object of the present invention to provide a display unit capable of illuminating the front face of the display panel thereof in a uniform luminance over the entire area of the display panel so that an image having high quality is displayed on a large display screen consisting of the display panels of a plurality of display units.

According to one aspect of the present invention there is provided a display unit comprising an elongated display panel; a light emitting body disposed behind said elongated display panel, said light emitting body including a middle section extending substantially parallel to said elongated display panel to face said elongated display panel from end to end and end sections on both sides of said middle section, each end section having a base attached thereto; and a case housing said elongated display panel and said light emitting body therewithin.

DESCRIPTION OF THE PREFERRED EMBODIMENTS

Figure 1:
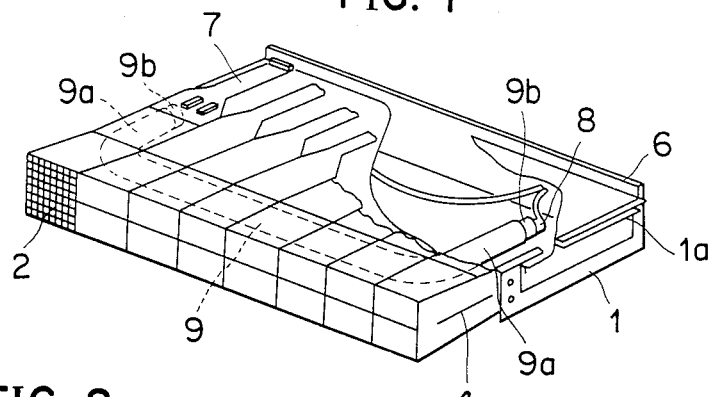
FIG. 1 is a partially cutaway perspective view of a display unit, in a first embodiment, according to the present invention.

FIG. 1 illustrates a liquid crystal display unit, in a first embodiment, according to the present invention. In FIG. 1, indicated at 9 is a substantially U-shaped fluorescent lamp employed as a light emitting body. The opposite end sections 9a of the fluorescent lamp 9 are bent perpendicularly to the middle section thereof to extend away therefrom to form a pair of inner corners on a far side of the fluorescent lamp 9 from the elongated display panel. Bases 9b are attached to the opposite end sections of the fluorescent lamp 9, respectively. The U-shaped fluorescent lamp 9 is disposed behind an elongated liquid crystal display panel 2 with the middle section thereof, namely, the straight portion, extending in parallel to the surface and over the overall length of the elongated liquid crystal display panel 2 to face the same from end to end and the opposite end sections extending away from the liquid crystal display panel 2.

The opposite end sections, which are less luminous than the middle section, are located outside a range corresponding to the liquid crystal display panel 2 and only the middle section of the U-shaped fluorescent lamp providing longitudinally uniform distribution of luminance is located opposite to the liquid crystal display panel 2. As a result, the liquid crystal display panel 2 is illuminated uniformly over the entire area thereof. Said elongated display panel 2 and said fluorescent lamp 9 are housed in a case 1.

The effective length of the bent end section 9a of the U-shaped fluorescent lamp 9 is not less than about 70 mm. The bending angle of the end sections need not necessarily be a right angle, but may be any angle for the same effect. When the bending angle is 180 degrees, that is, when a straight fluorescent lamp 3 is employed, the length of the fluorescent lamp needs to be decided so that the opposite end portions thereof having a lower luminance are located outside a range corresponding to the liquid crystal display panel. The cross sectional shape of the fluorescent lamp may be any suitable shape, such as an ellipse.

Thus, since only a portion of a fluorescent lamp having uniform luminance is disposed opposite to the liquid crystal display panel 2, the entire area 1 of the liquid crystal display panel 2 can be illuminated uniformly, which improves the quality of the image displayed on a large display screen consisting of a plurality of the liquid crystal display units of the present invention.

Figure 2:
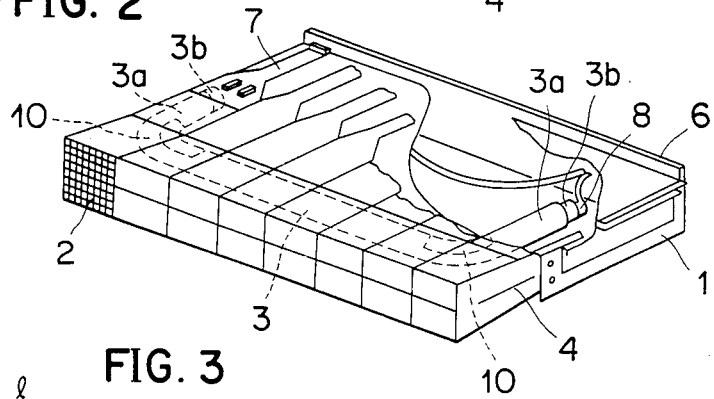
FIG. 2 is a partially cutaway perspective view of a display unit, in a second embodiment, according to the present invention.
Figure 3:
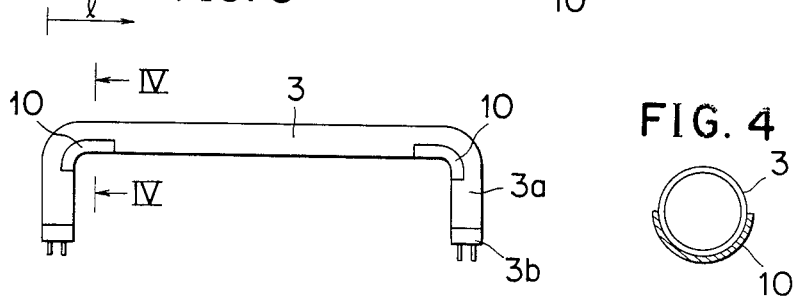
FIG. 3 is a plan view of a U-shaped fluorescent lamp employed in the first embodiment of the present invention.

FIGS. 2 and 3 illustrates a liquid crystal display unit, in a second embodiment, according to the present invention. The structure of this liquid crystal display unit is substantially the same as that of the first embodiment, except that the second embodiment employs a U-shaped fluorescent lamp provided with reflective tapes applied to the outer surface of each inner corner thereof.

Figure 4:
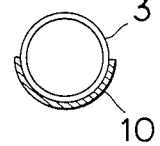
FIG. 4 is a cross section taken along line IV—IV of FIG. 3.

Referring to FIG. 4 illustrating said U-shaped fluorescent lamp 3 in a cross section, reflective tapes 10 are applied to the outer surface of the inner corners of the fluorescent lamp 3 at and around the inner corners of the bends, respectively. The reflective tape 10 is a synthetic resin tape coated with a film of a reflective metal, such as aluminium, formed through the vapor deposition process and a layer of an adhesive for applying the tape to the outer surface of the fluorescent lamp. The synthetic resin tape includes a transparent sheet of polyethelene or the like.

Figure 5:
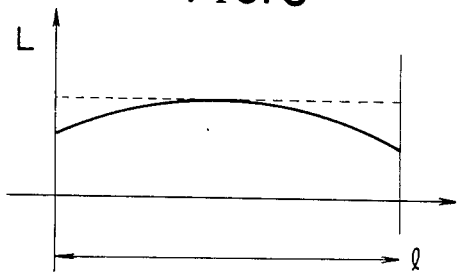
FIG. 5 is a graph showing the variation of luminance on the display panel with distance from one end of the display panel.

When the U-shaped fluorescent lamp 3 is lighted, the light radiated in the glass tube 9 toward the liquid crystal panel 2 travels through the glass tube 9 and falls directly on the liquid crystal display panel 2, while the light radiated in the opposite direction with respect to the liquid crystal display panel 2 is first reflected by the reflective tape 10, then the reflected light travels through the glass tube 9 toward the liquid crystal display panel 2, and then falls on the liquid crystal display panel 2. Thus, the portions of the liquid crystal display panel 2 corresponding to the reflective tapes 10 are irradiated by both the direct light and the reflected light. Consequently, the luminance in those portions is enhanced as compared with the luminance in the opposite end sections of the liquid crystal display panel of the conventional display unit, as indicated by broken line in FIG. 5. Thus, the distribution of luminance L over the enter area 1 of the liquid crystal display panel 2 is uniform.

Figure 6:
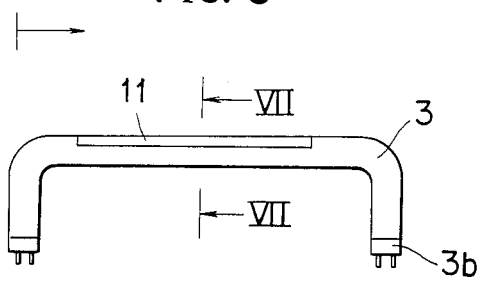
FIG. 6 is a plan view of a U-shaped fluorescent lamp employed in a display unit, in a third embodiment, according to the present invention.
Figure 7:
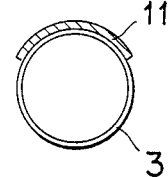
FIG. 7 is a cross section taken along line VII—VII of FIG. 6.
Figure 10:
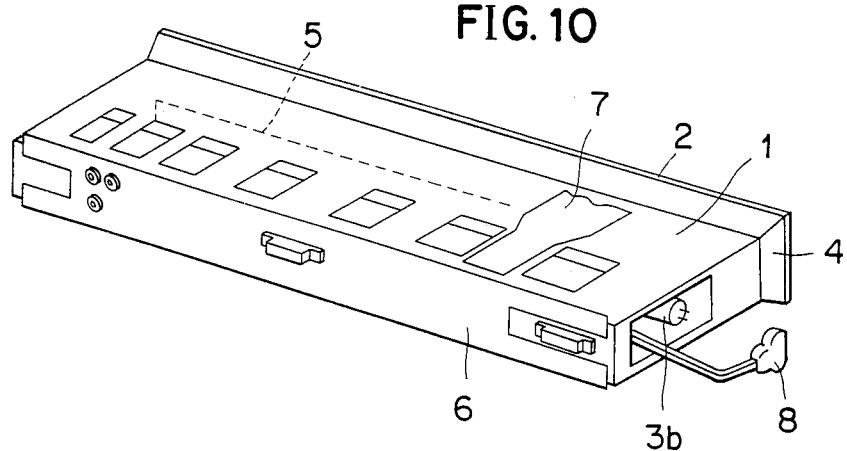
FIG. 10 is a perspective view of a conventional display unit.

FIGS. 6 and 7 illustrate a U-shaped fluorescent lamp employed in a third embodiment of the present invention. This U-shaped fluorescent lamp 3 has a reflective tape 11, which is similar to the reflective tape 10 employed in the second embodiment, applied to the outer surface of the middle section of a section thereof extending in parallel to the liquid crystal display panel 2 and facing the backside of the liquid crystal display panel 2. In this U-shaped fluorescent lamp 3, the light radiated in the glass tube 9 toward the liquid crystal display panel 2 is reflected by the reflective tape in the opposite direction, and hence the intensity of the light that falls on the liquid crystal display panel 2 in the portion corresponding to the middle section of the U-shaped fluorescent lamp 3, namely, the portion facing the reflective tape 11, is reduced. The length and width of the reflective tape 11 are decided so that the intensity of the light emitted by the middle section of the U-shaped fluorescent lamp 3 is reduced appropriately to a level corresponding to the intensity of light emitted by the opposite end portions of the same, and thereby the distribution of luminance over the entire area of the liquid crystal display panel 2 becomes uniform. This is accomplished by varying the amount of reflective metal to be vapor deposited on the transparent polyethylene tape. Furthermore, such reflective tapes may be laminated preferably at around the central position of the middle section of the fluorescent lamp 3 while a single sheet of reflective tape is applied to said middle section toward opposite ends thereof.

Figure 8:
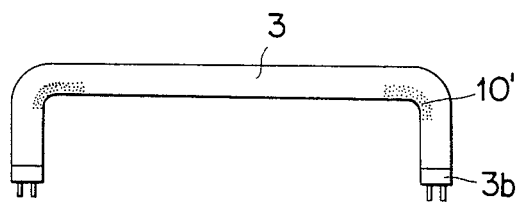
FIG. 8 is a plan view of a U-shaped fluorescent lamp employed in a display unit, in a fourth embodiment, according to the present invention.
Figure 9:
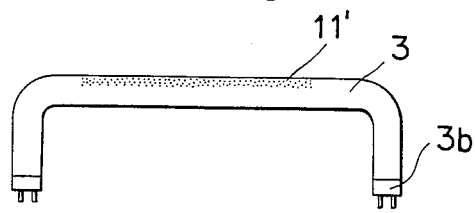
FIG. 9 is a plan view of a U-shaped fluorescent lamp employed in a display unit, in a fifth embodiment, according to the present invention.

It is also possible, for the same effect, to form a film 10' or 11' of a reflective metal through the vapor deposition process directly over the area corresponding to the area covered with the reflective tape or tapes in the second and third embodiments as shown in FIGS. 8 and 9.

As apparent from the foregoing description of the preferred embodiments of the present invention, according to the present invention, the relative position of the liquid crystal display panel 2 and the U-shaped fluorescent lamp is decided so that only a portion of the U-shaped fluorescent lamp, where the longitudinal distribution of luminance is uniform, is located opposite to the liquid crystal display panel, or a reflective tape or reflective tapes are applied to the outer surface of the glass tube of the U-shaped fluorescent lamp so that the longitudinal distribution of luminance of the U-shaped fluorescent lamp is uniform. Accordingly, the liquid crystal display panel is irradiated uniformly over the entire area thereof, and thereby the quality of the image displayed on the display screen consisting of a plurality of the liquid crystal display panels is improved.

Although the invention has been described in its preferred forms with a certain degree of particularity, it is to be understood that many changes and variations in the invention are possible without departing from the scope and spirit thereof.

What is claimed is:
1. A display unit, comprising:
an elongated display panel;
a fluorescent lamp disposed behind said elongated display panel, said fluorescent lamp including a middle section extending substantially parallel to said elongated display panel to face said elongated display panel from end to end, and end sections on both sides of said middle section, each end section having a base attached thereto; and a case housing said elongated display panel and said fluorescent lamp therewithin, wherein each end section of said fluorescent lamp is bent at a right angle with respect to said elongated display panel and extends away from said panel to form a pair of inner corners on a far side of the fluorescent lamp from the elongated display panel.

2. A display unit according to claim 1, wherein each inner corner of said bent portions of said fluorescent lamp has a reflective metal film disposed on an outer surface thereof.

3. A display unit according to claim 1, wherein said middle section has a reflective metal film disposed on an outer surface intermediate said ends and facing said elongated display panel.

4. A display unit according to any one of claims 2 and 3, wherein said reflective metal film includes a transparent synthetic resin tape vapor-deposited with a reflective metal.

5. A display unit according to any one of claims 2 and 3, wherein said reflective metal film includes a reflective layer formed through vapor depositing.

* * * * *